United States Patent
Veladanda et al.

(10) Patent No.: US 10,110,592 B2
(45) Date of Patent: Oct. 23, 2018

(54) REDUCING LATENCY FOR CERTIFICATE VALIDITY MESSAGES USING PRIVATE CONTENT DELIVERY NETWORKS

(71) Applicant: DigiCert, Inc., Lehi, UT (US)

(72) Inventors: Hari Veladanda, Pleasanton, CA (US); Ning Chai, San Jose, CA (US); Richard F. Andrews, Menlo Park, CA (US); Quentin Liu, San Jose, CA (US)

(73) Assignee: DigiCert, Inc., Lehi, UT (US)

( * ) Notice: Subject to any disclaimer, the term of this patent is extended or adjusted under 35 U.S.C. 154(b) by 197 days.

(21) Appl. No.: 14/135,277

(22) Filed: Dec. 19, 2013

(65) Prior Publication Data
US 2015/0100779 A1    Apr. 9, 2015

Related U.S. Application Data

(63) Continuation-in-part of application No. 14/050,245, filed on Oct. 9, 2013.

(51) Int. Cl.
*H04L 21/00* (2006.01)
*H04L 29/06* (2006.01)
*H04L 9/32* (2006.01)
*H04L 29/08* (2006.01)

(52) U.S. Cl.
CPC ........ *H04L 63/0823* (2013.01); *H04L 9/3268* (2013.01); *H04L 67/2842* (2013.01)

(58) Field of Classification Search
CPC .................................................... H04L 9/3247
See application file for complete search history.

(56) References Cited

U.S. PATENT DOCUMENTS

| | | | |
|---|---|---|---|
| 2002/0029200 A1* | 3/2002 | Dulin et al. | 705/67 |
| 2002/0053023 A1* | 5/2002 | Patterson et al. | 713/156 |
| 2005/0114666 A1* | 5/2005 | Sudia | 713/175 |
| 2005/0193204 A1* | 9/2005 | Engberg et al. | 713/175 |
| 2005/0228999 A1* | 10/2005 | Jerdonek et al. | 713/176 |

(Continued)

FOREIGN PATENT DOCUMENTS

WO    2014047171 A1    3/2014

OTHER PUBLICATIONS

"Ultralight OCSP: Improving Revocation Checking", Feb. 9, 2012, www.digicert.com.

(Continued)

*Primary Examiner* — Morshed Mehedi
(74) *Attorney, Agent, or Firm* — Knobbe, Martens, Olson & Bear LLP

(57) ABSTRACT

Techniques are disclosed for accelerating online certificate status protocol (OCSP) response distribution to relying parties using a content delivery network (CDN). A certificate authority generates updated OCSP responses for OCSP responses cached in the CDN that are about to expire. In addition, the certificate authority pre-generates cache keys in place of CDNs generating the keys. The certificate authority sends the OCSP responses and the cache keys in one transaction, and the CDN, in turn, serves requests for the OCSP responses using the cache keys. For new certificates, a private CDN is pre-populated with an OCSP response for a certificate concurrent with that certificate being issued. Doing so effectively uses the PCDN as an origin server for OCSP responses, reducing CA infrastructure needs.

20 Claims, 10 Drawing Sheets

(56) References Cited

U.S. PATENT DOCUMENTS

| | | |
|---|---|---|
| 2011/0074788 A1 | 3/2011 | Regan et al. |
| 2011/0161663 A1* | 6/2011 | Nakhjiri .................. 713/158 |
| 2013/0156189 A1* | 6/2013 | Gero et al. ................ 380/255 |
| 2014/0222446 A1 | 8/2014 | Ash et al. |
| 2015/0012297 A1 | 1/2015 | Ash et al. |

OTHER PUBLICATIONS

Tiemann, Paul; "Scaling OCSP via DNS", Apr. 29, 2011, https://groups.goodle.com/forum/#!msg/mozilla,dev.security.policy/pfFLvTFZxE8/cXVZ3r1u4U0J.

Prince, Matthew; "OCSP Stapling: How Cloudflare Just Made SSL 30% Faster"; Oct. 29, 2012; http://blog.cloudflare.com/ocsp-stapling-how-cludflare-just-made-ssl-30/.

Pala, Massimiliano; Rea, Scott; "OCSP over DNS"; Aug. 1, 2012; www.digicert.com.

U.S. Appl. No. 14/050,245, entitled "Accelerating OCSP Responses via Content Delivery Network Collaboration", filed Oct. 9, 2013.

International Search Report and Written Opinion for PCT/US2016/029178 dated Jul. 19, 2016.

\* cited by examiner

REDUCING LATENCY FOR CERTIFICATE VALIDITY MESSAGES USING PRIVATE CONTENT DELIVERY NETWORKS

CROSS-REFERENCE TO RELATED APPLICATIONS

This application is a continuation-in-part of co-pending U.S. patent application Ser. No. 14/050,245 filed Oct. 9, 2013 and entitled "Accelerating OCSP Responses via Content Delivery Network Collaboration". The aforementioned related patent application is herein incorporated by reference in its entirety.

BACKGROUND

Field

Embodiments presented herein generally relate to techniques for computer security. More specifically, techniques are disclosed for increasing the performance of online certificate status protocol responses to relying parties using a content delivery network.

Description of the Related Art

Online certificate status protocol (OCSP) is a method of delivering a status of a digital certificate to a relying party. When an OCSP request for a certificate is received, a certificate authority sends a digitally signed OCSP response to the relying party. Such a response indicates whether the certificate is valid or revoked. Once signed, an OCSP response is valid and correct for a specified period of time, e.g., seven days, or until the certificate is revoked.

A large commercial certificate authority may issue thousands, or even millions, of certificates. In such cases, it may be impractical for a certificate authority to send OCSP responses to relying parties directly. Instead, the certificate authority may rely on a content delivery network (CDN) as a front-end distributor of OCSP responses. As is known, web services use CDNs to distribute content to end-users with high availability and performance. CDNs may include computer servers deployed in multiple locations to reduce bandwidth costs, page load times, and increase the availability of content. Upon receiving content from an origin server for distribution to an end-user, a server caches the content before sending it to the end-user. Because the content provided by CDNs is typically static or otherwise slowly-changing, certificate authorities can effectively distribute the OCSP responses to relying parties via a CDN.

However, current approaches by certificate authorities for using CDNs to distribute responses raise several issues. For example, although OCSP responses may remain valid for a certain period of time, a certificate authority may revoke the underlying certificate before the certificate expires. Because CDNs cache OCSP responses ahead of time, the OCSP response on the CDN may still indicate that the certificate is valid despite the certificate authority indicating otherwise (i.e., the OCSP response on the CDN servers is incorrect). Another concern is that when a signed OCSP response expires, the CDN removes the response from the cache and a relying party must then retrieve an updated OCSP response from the origin server of the CDN, which can degrade response times.

Further, when a new certificate is delivered and installed on a client server, e.g., an SSL certificate binding a key to a domain named in the SSL certificate, any request directed to the CDN to validate that certificate will fail. Instead, the CDN redirects such requests to a service hosted by the issuing certificate authority (CA). However, doing so results in higher infrastructure demands for the CA and slower response times for validating recently-issued certificates.

SUMMARY

One embodiment presented herein includes a method for reducing response latency for certificate validity messages using a private content delivery network. This method may generally include generating, by a certificate authority, a digital certificate and generating, for the digital certificate, a certificate validity message. This method may also include prompting a computing server in a private content delivery network (PCDN) to request the certificate validity message. The PCDN caches content for a plurality of local CDN nodes. Upon receiving a request for the certificate validity message from the PCDN, the certificate validity message is sent to the PCDN.

Other embodiments include, without limitation, a computer-readable medium that includes instructions that enable a processing unit to implement one or more aspects of the disclosed methods as well as a system having a processor, memory, and application programs configured to implement one or more aspects of the disclosed methods.

BRIEF DESCRIPTION OF THE DRAWINGS

So that the manner in which the above recited aspects are attained and can be understood in detail, a more particular description of embodiments of the invention, briefly summarized above, may be had by reference to the appended drawings.

Note, however, that the appended drawings illustrate only typical embodiments of this invention and are therefore not to be considered limiting of its scope, for the invention may admit to other equally effective embodiments.

DETAILED DESCRIPTION

Figure 1:
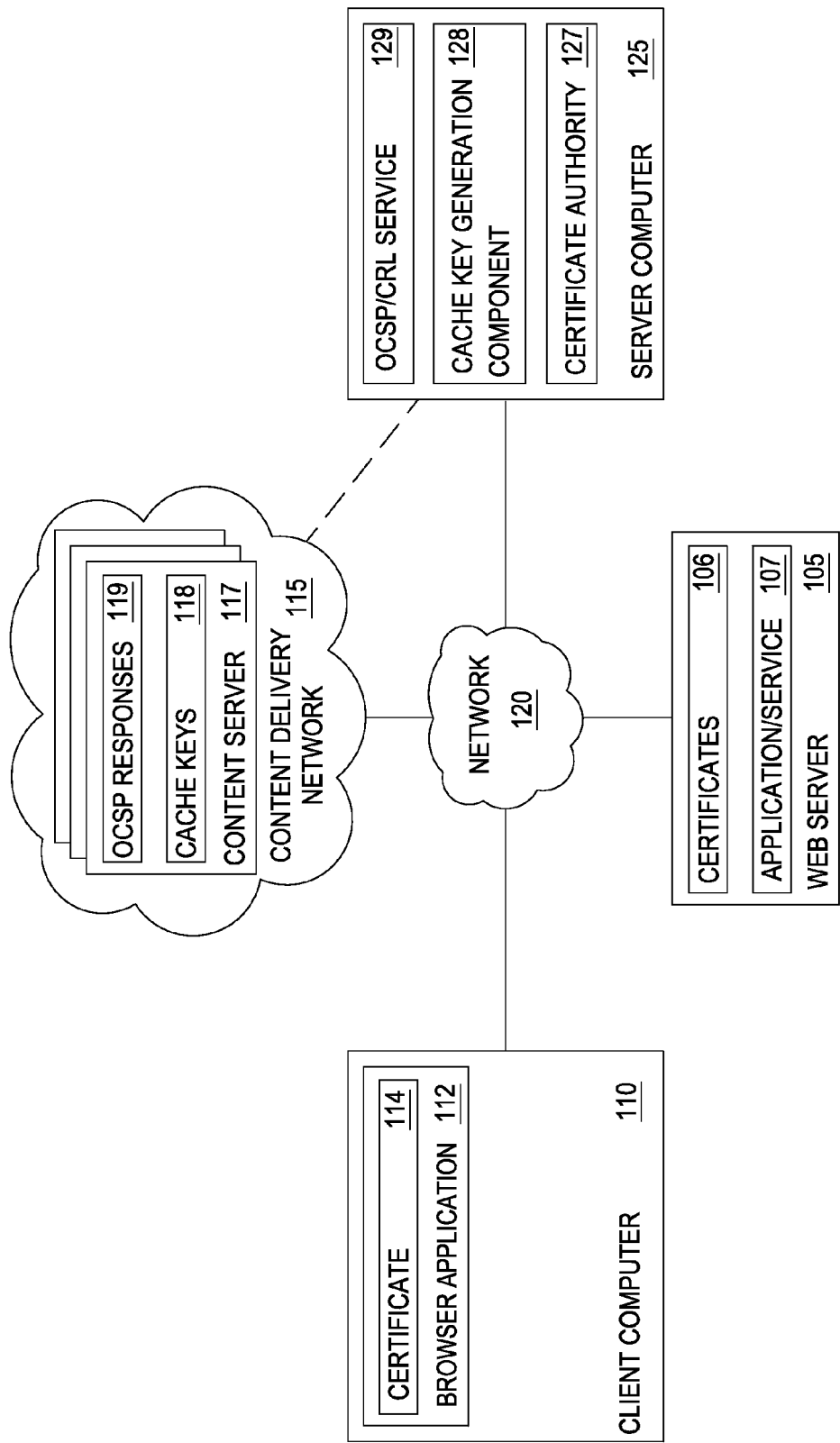
FIG. 1 illustrates an example computing environment, according to one embodiment.

Embodiments presented herein provide techniques for accelerating the distribution of online certificate status protocol (OCSP) responses to relying parties via a content delivery network (CDN). The techniques disclosed herein reduce the amount of time required for a relying party to receive an OCSP response from a certificate authority. In one embodiment, the certificate authority generates updated OCSP responses for multiple OCSP responses that are about to expire (or certificates that have been revoked). In addition, the certificate authority generates cache keys for each updated OCSP response using an algorithm provided by the CDN. Rather than wait for the CDN to request updated OCSP responses from the certificate authority (i.e., after the OCSP responses expire), the certificate authority sends the OCSP responses along with the corresponding cache keys. Further, the responses and keys may be sent in the aggregate as a single transaction. The CDN updates the OCSP responses using the cache keys, allowing for fast retrieval of the OCSP responses from the CDN cache.

In addition, the CDN may send the certificate authority data indicating a frequency of requests for different OCSP responses (e.g., through a cache utilization measure). For example, in some situations, CDNs may be unable to cache every OCSP response for large certificate authorities. Further, a majority of relying parties may be requesting an OCSP response for a small percentage of the certificate authority's overall certificates. Therefore, rather than send OCSP responses for all certificates managed by the certificate authority, the certificate authority sends the CDN OCSP responses for the most highly-requested certificates.

Sending the CDN multiple updated OCSP responses and cache keys allows the CDN to deliver responses to relying parties more quickly. That is, this approach requires less effort by the CDN to obtain updated OCSP responses. For instance, rather than a CDN waiting for a certificate to expire and requesting an updated version from the certificate authority, the certificate authority instead sends the updated response before it is first needed. This approach minimizes the window of time that the CDN sends stale or incorrect OCSP responses to a relying party and also eliminates the need for a relying party to retrieve the OCSP response from the origin server of the CDN after the OCSP response expires. Further, rather than send separate updated responses to the CDN, the certificate authority sends whatever updated responses are available in one transaction. Further still, the CDN also does not have to generate cache keys because the certificate authority has already pre-generated the cache keys. Doing so reduces the time required to process multiple OCSP responses to the CDN cache.

Generating an OCSP response can commonly take anywhere from 500-1000 msec. This is a substantial performance issue given that any e-commerce site needs an OCSP response for each transaction secured using a certificate (e.g., an SSL certificate). As page load time is a significant component of performance and usability, a large delay for generating an OCSP response for each transaction substantially degrades perceived site performance.

In one embodiment, to reduce the latency a client experiences when issuing an OCSP request, the CA causes a Private CDN (PCDN) server to request an OCSP response at generally the same time a new certificate is generated and issued by the CA. Doing so automatically injects the OCSP response into the CDN network. For example, when a CA issues a new SSL certificate, the CA also provokes a PCDN server within a CDN network to request an OCSP response indicating the validity of the new certificate. Once received, the PCDN populates a local cache with the OCSP response. Using this approach, the PCDN cache is populated with OCSP response for SSL certificates as they are issued.

Further, the PCDN can distribute the OCSP response to local CDN nodes, without requiring further interaction with the OCSP response service of the CA. For example, when a client browser accesses a site secured by an SSL certificate and requests an OCSP response indicating the validity of the SSL certificate, the local CDN node acquires the response from the PCDN cache, rather than generating a new request to the OCSP response service of the CA. The local CDN node also stores the response in the cache of a local CDN node, allowing it to serve subsequent request for that OCSP response. Advantageously, as the CA is generating requests to its OCSP responder and not receiving requests from end customers (by provoking the PCDN to request the OCSP response), the infrastructure needed for the CA to provide the OCSP responder service is greatly reduced.

Pre-Populating a CDN Cache with Certificate Validity Messages Response Messages

FIG. 1 illustrates an example computing environment 100, according to one embodiment. As shown, the computing environment 100 includes a web server 105 hosting a computing resource (e.g., application/service 107). The server computer 105 may be a physical computing system (e.g., a system in a data center) or may be a virtual computing instance executing within a computing cloud. In any event, the computing system 105 hosts an application/service 107 accessed by clients using computing system 110. For example, web server 105 may be owned and operated by a company providing a service to client computers 110, such as an online banking service. Client computers access the service using a browser application 112. When engaging in secure transactions with client computer 110, web server 105 may present digital certificates 106 to client computer 110, and in turn, the client computer may store a certificate 114 in the cache of browser application 112.

Computing environment 100 also includes a server computer 125 that manages and issues digital certificates to customers (e.g., the bank described above using a web server 105). Server computer 125 includes a certificate authority 127, an online certificate status protocol/certificate revocation list (OCSP/CRL) service 129, and a cache key generation component 128. A client computer 110 verifies the validity of certificate 114 by sending an OCSP request to certificate authority 127. Certificate authority 127 identifies whether certificate 127 is valid (or revoked) by using the OCSP/CRL service 129. Server computer 125 sends the result to client computer 110 as an OCSP response that indicates whether certificate 114 is valid or revoked. Certificate authority 127 digitally signs each OCSP response. Once signed, an OCSP response is valid for a certain period of time, e.g., for seven days, or until certificate authority 127 revokes the underlying certificate.

In some situations, server computer 105 may manage millions of digital certificates and delegate the distribution of OCSP responses to a content delivery network (CDN) 115. CDN 115 may include multiple content servers 117 that store OCSP responses 119 generated and sent to CDN 115 by server computer 125. Generally, upon receiving an OCSP response 119 from server computer 125, CDN 115 generates a cache key 118 for the OCSP response 119. A cache key 118 allows CDN 115 to identify content served by the CDN, in the present context, an OCSP response 119. CDN 115 uses the cache key to retrieve the OCSP response 119 from the cache in response to OCSP requests.

Generally, when an OCSP response 119 expires, CDN 115 may request an updated OCSP response from the certificate authority 127. In one embodiment, however, server computer 125 may generate updated responses for the OCSP responses that are soon expiring (or have been revoked by OCSP/CRL service 129) and send multiple updated OCSP responses to CDN 115 in one transaction. Further, in one embodiment, CDN 115 provides an algorithm for generating the cache keys 118. Doing so allows server computer 125 (through cache key generation component 128) to generate cache keys 118 to send to CDN 115. Doing so reduces the time required by CDN 115 to process and cache OCSP responses 119 across content servers 117.

Figure 2:
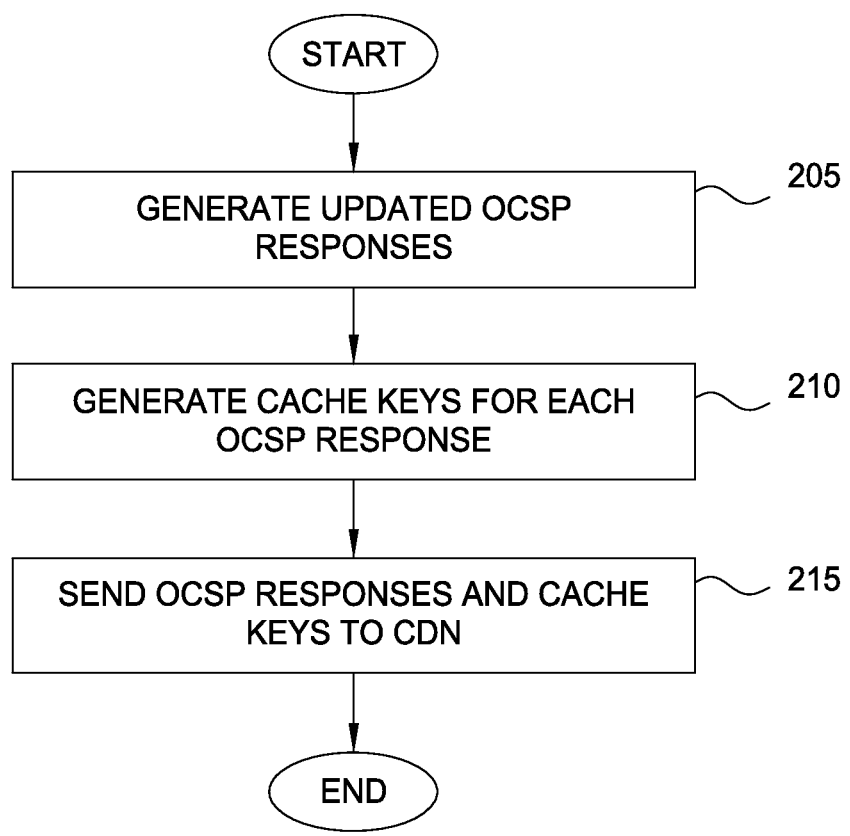
FIG. 2 illustrates a method for distributing online certificate status protocol (OCSP) responses to a content delivery network (CDN), according to one embodiment.

FIG. 2 illustrates a method 200 for distributing updated OCSP responses to a CDN, according to one embodiment. As stated, the certificate authority generates a collection of OCSP responses and sends them to the CDN before such OCSP responses expire. As shown, method 200 begins at step 205, where the certificate authority generates updated OCSP responses for the responses that are about to expire or for certificates that have been revoked. The batch of generated OCSP responses may correspond to the certificates of numerous organizations (e.g., a certificate from bank A, a certificate from bank B, a certificate from merchant X, etc.). Note, the period before the responses expire may be set as a matter of preference, but two days before expiration has proven to be a reasonable amount of time.

At step 210, the certificate authority generates a cache key corresponding to each OCSP response. To generate the cache keys, the certificate authority may use a key generation algorithm agreed upon with the CDN provider (e.g., an algorithm used by the CDN itself to generate such keys). At step 215, the certificate authority sends the OCSP responses and cache keys to the CDN. The CDN receives the OCSP responses and stores each OCSP response in the cache.

Figure 3:
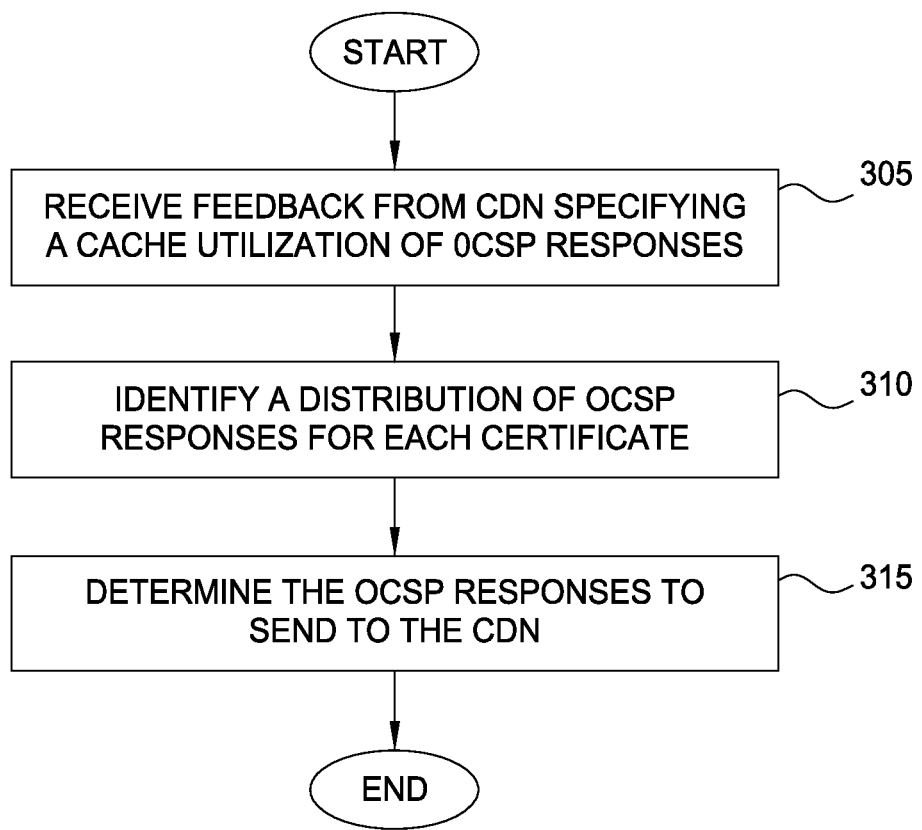
FIG. 3 illustrates a method for further optimizing the distribution of updated OCSP responses to a CDN for highly requested certificates, according to one embodiment.

This approach also reduces the window of time that a CDN sends stale OCSP responses to relying parties. For example, assume that a certificate authority sends an OCSP response for a certificate A, and the OCSP response is valid for seven days. Further assume that the certificate authority revokes certificate A on the second day. In this case, to prevent the CDN from distributing the older response to a relying party (and then retrieving the updated OCSP from the CDN before the response expires), the certificate authority generates the updated OCSP response and proactively sends the response to the CDN. FIG. 3 illustrates a method 300 for further optimizing the distribution of updated OCSP responses to a CDN described in method 200, according to one embodiment. In the case of a large certificate authority, a CDN might be unable to efficiently cache and distribute OCSP responses for each certificate. Therefore, in one embodiment, the certificate authority may send OCSP responses (and corresponding CDN cache keys) for the most frequently requested certificates.

As shown, method 300 begins at step 305, where the certificate authority receives feedback from the CDN. The feedback may specify a cache utilization measure of OCSP responses sent to relying parties. For example, the cache utilization measure may be determined from the actual requests received from relying parties (e.g., requests received over a week, month, etc.).

At step 310, the certificate authority identifies a distribution of OCSP responses sent for each certificate. For example, the distribution may indicate that 90% of OCSP requests correspond to 15% of the certificates managed by the certificate authority. At step 315, the certificate authority determines which OCSP updates to generate and send to the CDN. For instance, the certificate authority may decide to send OCSP responses for the 15% of the certificates managed by the CA. Once identified, the certificate authority sends OCSP responses for those certificates as described above.

Under this approach, the OCSP response cache entries for less frequently requested certificates (i.e., the ones not being sent in advance) expire at the CDN. When the CDN receives a request corresponding to an expired OCSP response, the CDN retrieves and re-caches the OCSP response from the certificate authority.

Figure 4:
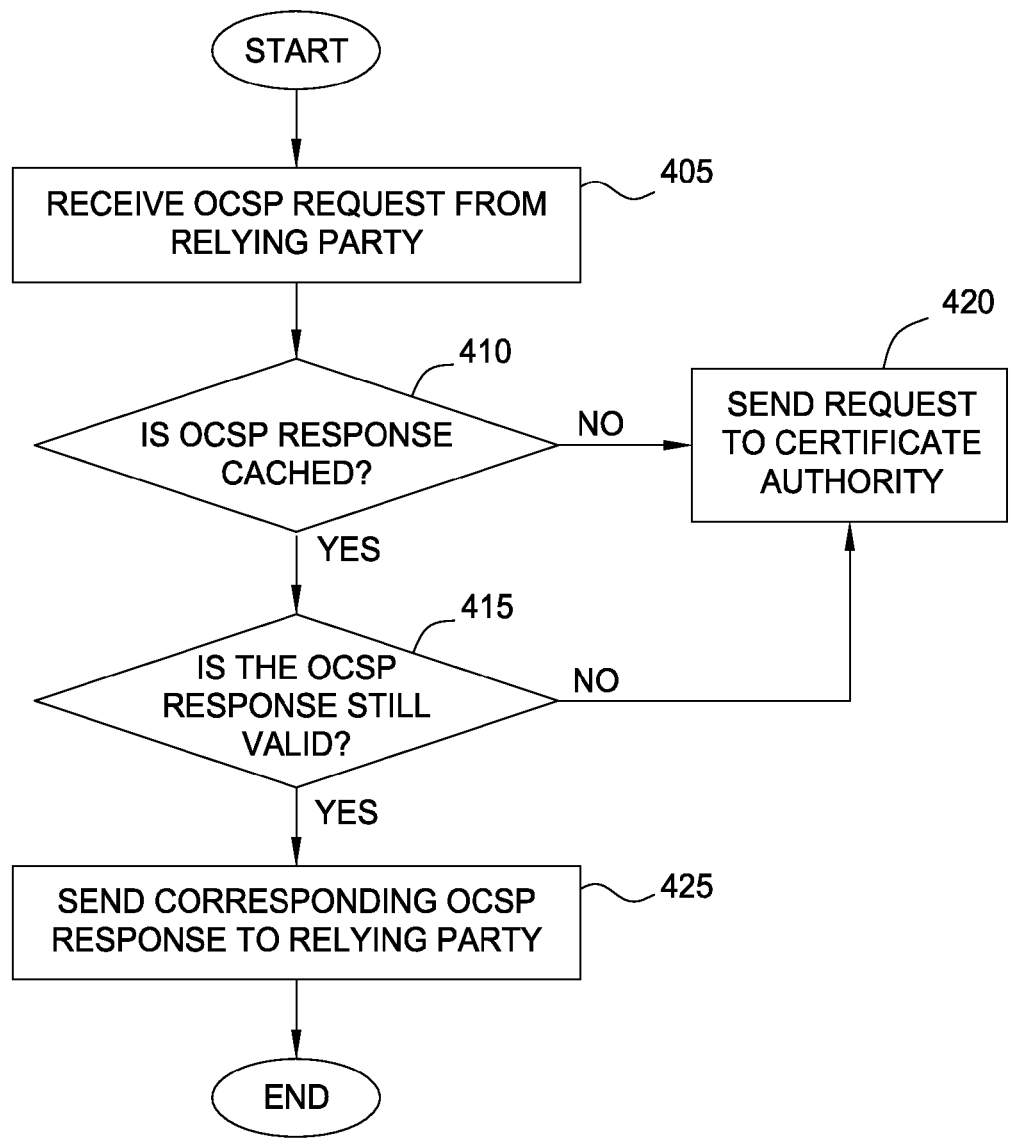
FIG. 4 illustrates a method for processing OCSP requests to a CDN made by a relying party, according to one embodiment.

FIG. 4 illustrates a method 400 for handling OCSP requests in the CDN, according to one embodiment. More specifically, method 400 illustrates the approach where the certificate authority sends updated OCSP responses for the most frequently requested certificates. As shown, method 400 begins at step 405, where a content server in a CDN receives an OCSP request from a relying party. A relying party may be a web browser application that has received a digitally signed certificate from a web server. When the content server receives the OCSP request, the content server determines whether the OCSP response corresponding to the underlying certificate is cached in the CDN (step 410).

At step 415, if the OCSP response is cached in the CDN, then the content server determines whether the OCSP response is still valid (i.e., not expired). If so, the CDN (through the content server storing the OCSP response) sends the OCSP response to the relying party (step 425). However, if the OCSP response is not valid (or not cached), then the content server sends the request to the certificate authority (at step 420) and retrieves a valid OCSP response. Step 420 may be performed for a less frequently requested certificate, after one OCSP response has expired. When the CDN receives the updated OCSP response, the CDN generates a cache key for the OCSP response and distributes the OCSP response through the content servers.

Figure 5:
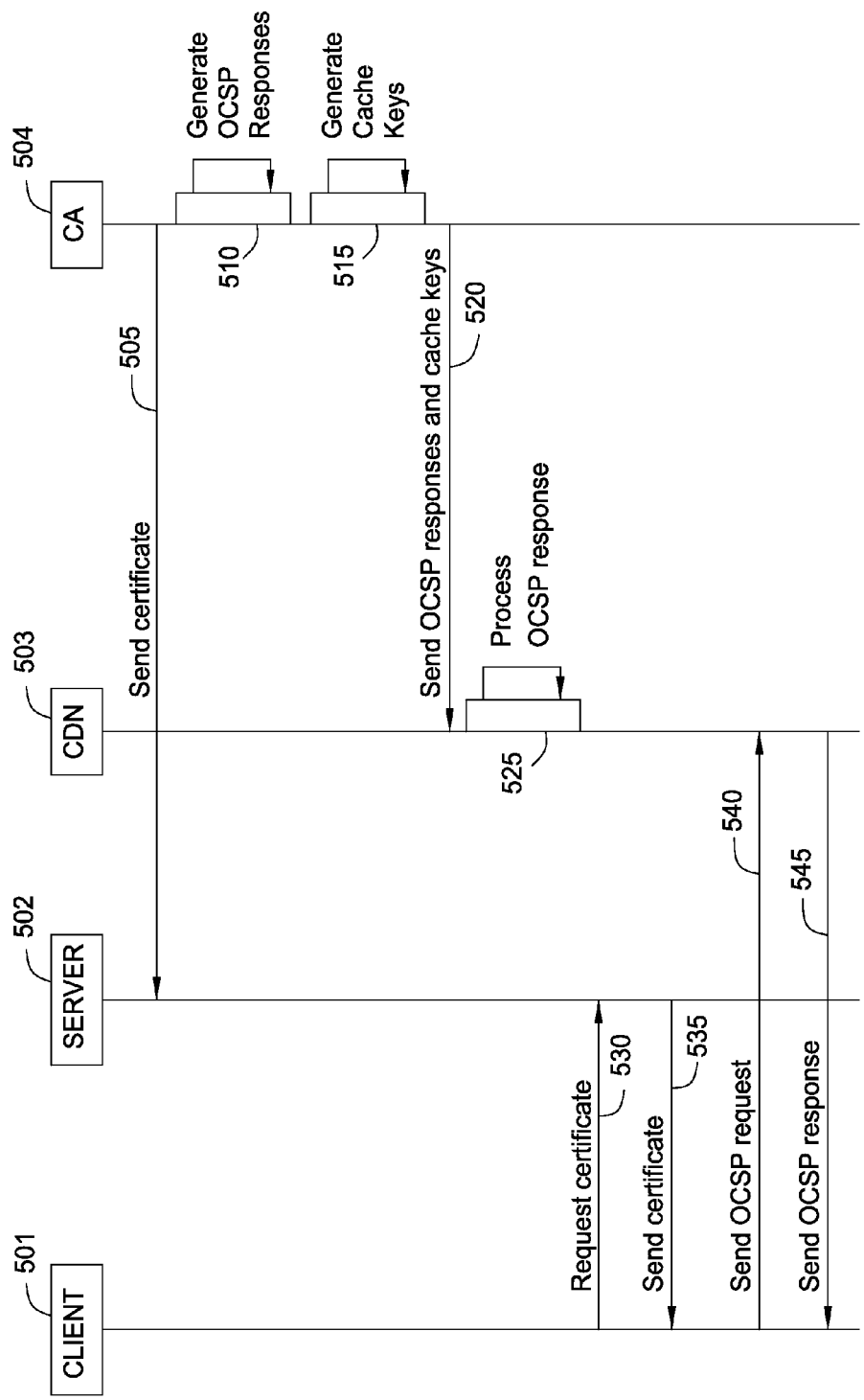
FIG. 5 illustrates a sequence diagram for accelerating the distribution of OCSP responses to a relying party using a CDN, according to one embodiment.

FIG. 5 illustrates a sequence diagram 500 for accelerating the distribution of OCSP responses to a relying party (e.g., a client 501) using a CDN 503, according to one embodiment. As shown, a certificate authority 504 sends a certificate to a web server 502 (at 505). Certificate authority 504 generates updated OCSP responses (at 510). For example, certificate authority 504 may do so for certificates that have been revoked or for OCSP responses that are about to expire. As the OCSP responses are generated, certificate authority 504 generates cache keys for each response (at 515). As stated, the pre-computation of such keys allows CDN 503 to quickly process the updated OCSP responses upon receipt. After generating the batch of updated OCSP responses and corresponding cache keys, certificate authority 504 sends the OCSP responses and cache keys to CDN 503. CDN 503 and caches the OCSP responses using the cache keys (at 525).

At 530, a relying party (e.g., client 501) requests a certificate from server 502. Server 502 sends the certificate to client 501 (at 535). At 540, the client 501 sends an OCSP request to CDN 503 to determine whether the certificate sent from the server is valid. In response, the CDN 503 determines whether the corresponding OCSP response is stored in the network. If so, the cache key provided by certificate authority 504 allows the CDN to quickly identify where the OCSP response is located. And once identified, at 545, CDN 503 sends the OCSP response to client 501.

Figure 6:
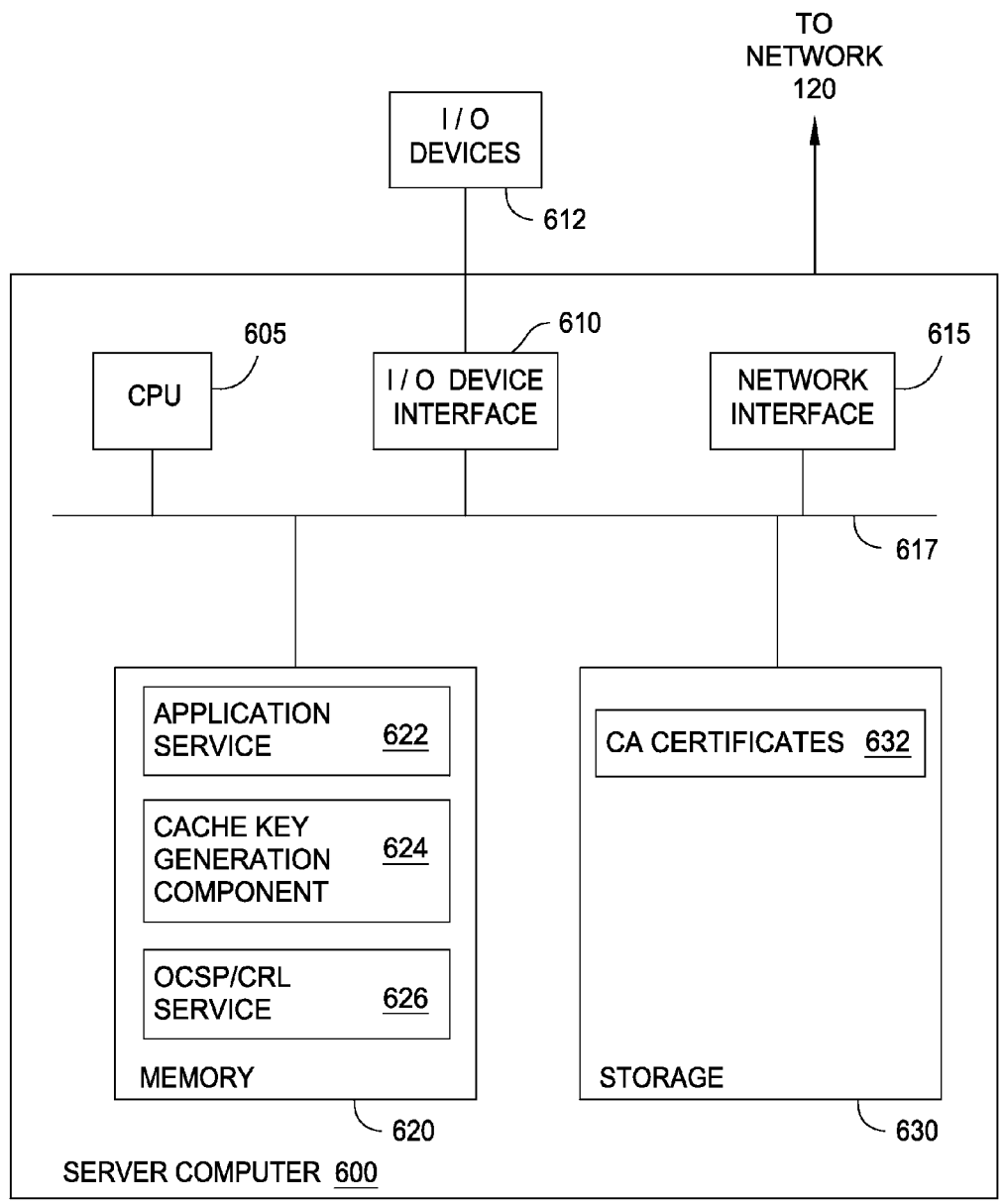
FIG. 6 illustrates an example computing system configured to generate OCSP responses and cache keys to distribute to a CDN, according to one embodiment.

FIG. 6 illustrates an example computing system 600 configured to generate OCSP responses and cache keys to distribute to a CDN, according to one embodiment. As shown, computing system 600 includes, without limitation, a central processing unit (CPU) 605, a network interface 615, a network interface 615, a memory 620, and storage 630, each connected to a bus 617. Computing system 600 may also include an I/O device interface 610 connecting I/O devices 612 (e.g., keyboard, display and mouse devices) to the computing system 600. Further, in context of this disclosure, the computing elements shown in computing system 600 may correspond to a physical computing system (e.g., a system in a data center) or may be a virtual computing instance executing within a computing cloud.

CPU 605 retrieves and executes programming instructions stored in memory 620 as well as stores and retrieves application data residing in the memory 630. The interconnect 617 is used to transmit programming instructions and application data between CPU 605, I/O devices interface 610, storage 630, network interface 615, and memory 620. Note, CPU 605 is included to be representative of a single CPU, multiple CPUs, a single CPU having multiple processing cores, and the like. Memory 620 is generally included to be representative of a random access memory. Storage 630 may be a disk drive storage device. Although shown as a single unit, storage 630 may be a combination of fixed and/or removable storage devices, such as fixed disc drives, removable memory cards, or optical storage, network attached storage (NAS), or a storage area-network (SAN).

Illustratively, memory 620 includes an application/service 622, an OCSP/CRL service 626, and a cache key generation component 624. Storage 630 includes one or more certificates 632. Application/service 622 generally provides one or more software applications and/or computing resources accessed over a network 120. OCSP/CRL service 626 generates OCSP responses based on certificates 632 to send to a CDN. Further, OCSP/CRL service 626 maintains a list of revoked certificates 632. When one of the certificates 632 is revoked or a certain OCSP response issued to a CDN is about to expire, OCSP/CRL service 626 generates updated OCSP responses and sends the responses to the CDN. As OCSP/CRL service 626 generates each OCSP response, cache key generation component computes cache keys using an algorithm provided by the CDN (e.g., such as one used by the CDN to compute its own cache keys).

Figure 7:
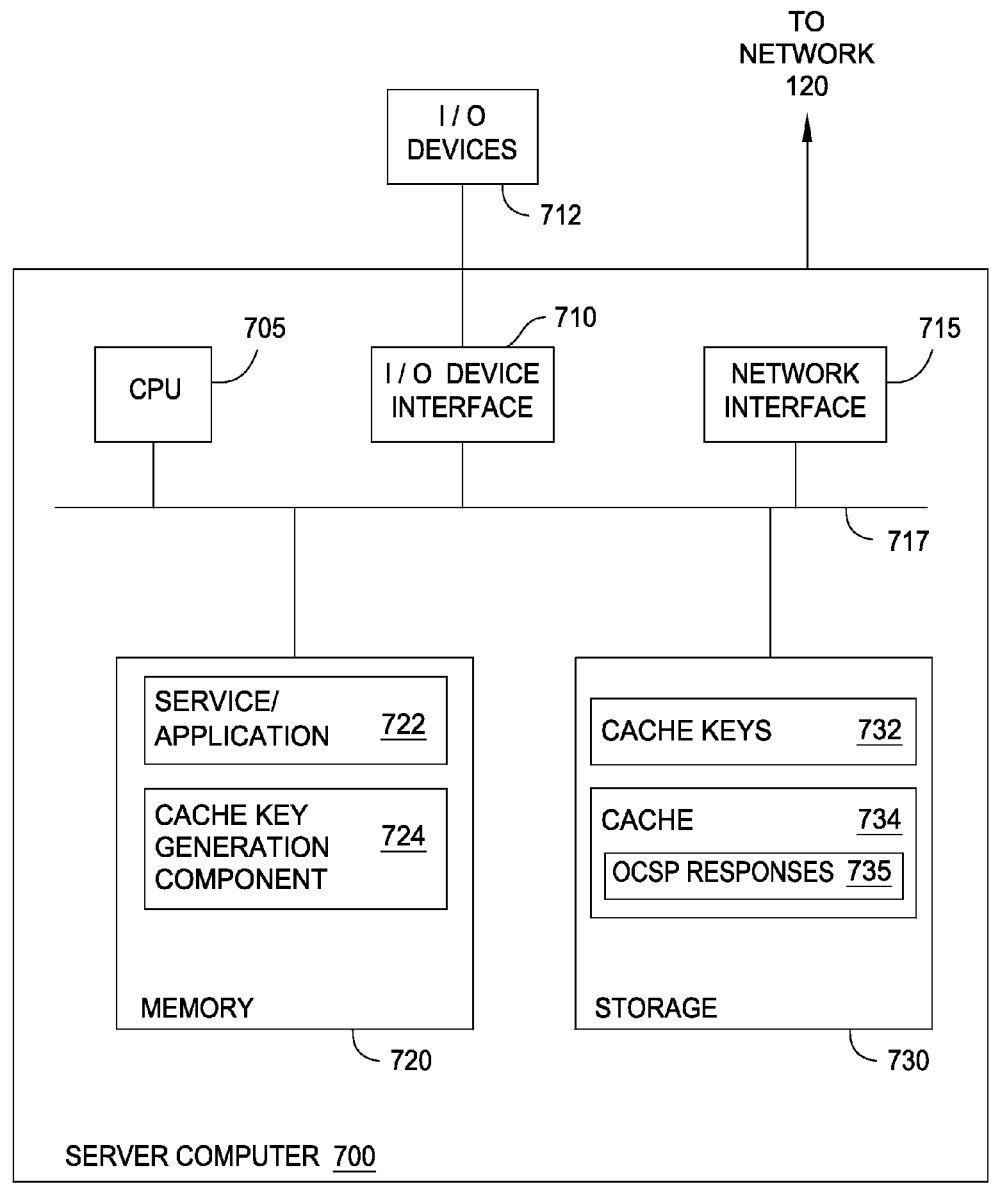
FIG. 7 illustrates an example computing system configured to receive updated OCSP responses and cache keys for each response, according to one embodiment.

FIG. 7 illustrates an example computing system 700 configured to receive updated OCSP responses and cache keys for each response, according to one embodiment. As shown, computing system 700 includes, without limitation, a central processing unit (CPU) 705, a network interface 715, a network interface 715, a memory 720, and storage 730, each connected to a bus 717. Computing system 700 may also include an I/O device interface 710 connecting I/O devices 712 (e.g., keyboard, display and mouse devices) to computing system 700. Further, in context of this disclosure, the computing elements shown in computing system 700 may correspond to a physical computing system (e.g., a system in a data center) or may be a virtual computing instance executing within a computing cloud.

CPU 705 retrieves and executes programming instructions stored in memory 720 as well as stores and retrieves application data residing in the memory 730. Interconnect 717 is used to transmit programming instructions and application data between CPU 705, I/O devices interface 710, storage 730, network interface 715, and memory 720. Note, CPU 705 is included to be representative of a single CPU, multiple CPUs, a single CPU having multiple processing cores, and the like. Memory 720 is generally included to be representative of a random access memory. Storage 730 may be a disk drive storage device. Although shown as a single unit, storage 730 may be a combination of fixed and/or removable storage devices, such as fixed disc drives, removable memory cards, or optical storage, network attached storage (NAS), or a storage area-network (SAN).

Illustratively, memory 720 includes an application/service 722 and a cache key generation component 724. Storage 730 includes one or more cache keys 732 and a cache 734. Cache 734 itself includes one or more OCSP responses 735. The application/service 722 generally provides one or more software applications and/or computing resources accessed over a network 120. Application/service 722 receives OCSP responses 735 and cache keys 732 from a certificate authority and stores OCSP responses 735 using cache keys 732. In the case where the certificate authority only sends the most frequently requested OCSP responses to server computer 700, server computer 700 allows OCSP responses 735 for the less frequently requested OCSP responses to expire. When a relying party requests an expired OCSP response, server computer 700 (e.g., through application/service 722) retrieves the up-to-date OCSP response from the certificate authority, generates a cache key 732 (using cache key generation component 724), and stores the OCSP response in cache 734.

Figure 8:
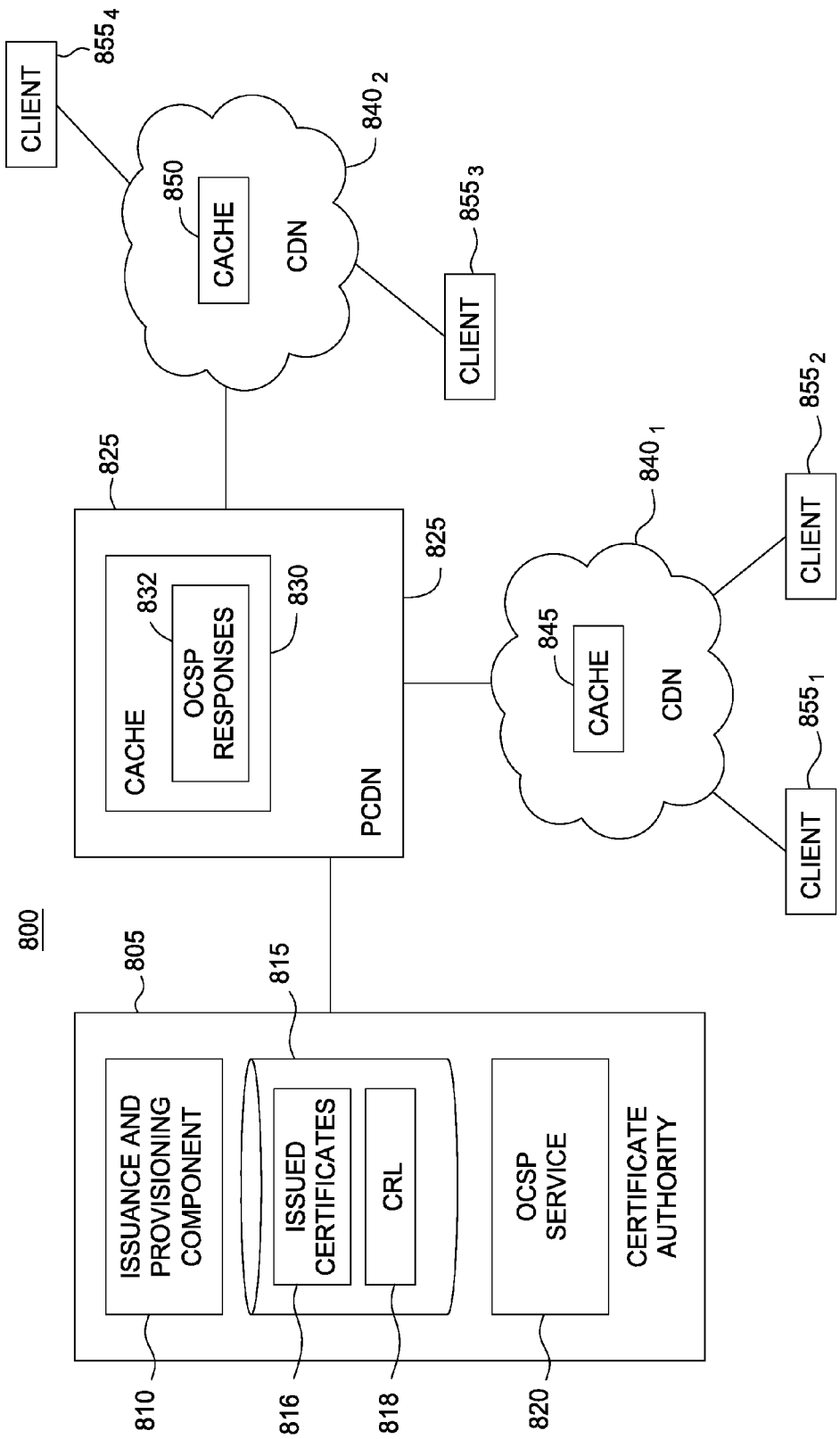
FIG. 8 illustrates a system for using a private CDN (PCDN) to cache an OCSP response for new certificates issued by a certificate authority (CA), according to one embodiment.

Reducing Latency for Certificate Validity Messages Using Private Content Delivery Networks FIG. 8 illustrates a system 800 for using a Private CDN to cache an OCSP response for new certificates issued by a certificate authority (CA), according to one embodiment. The system 800 generally incorporates the computing systems described above relative to FIGS. 1, 6, and 7. As shown, the system 800 includes a certificate authority 805, a Private CDN (PCDN) 825, and local CDNs $840_1$ and $840_2$. The local CDNs $840_{1-2}$ each serve a set of clients $855_{1-4}$. As known, local CDNs $840_{1-2}$ may be situated in different geographic locations to provide access to static content hosted by the CDNs.

As shown, the CA 805 includes an issuance and provisioning component 810, a database 815 stores certificates 815 issued by the CA 805 and a certificate revocation list (CRL). In addition, the CA hosts a service 820 used to respond to requests to provide the current validity of one of a certificate 816 issued by the CA 805. As known, the CA may determine the validity of a certificate by identifying a validity period of the certificate and by determining whether the certificate is listed on the CRL 618. Once determined, the OCSP service 820 can generate a response message returned to a requesting client.

The issuance and provisioning component 810 provides software and hardware systems configured to receive requests for new certificates, and once vetted, issue certificates to a requesting party. Again, e.g., an operator of a ecommerce website may request an SSL certificate to bind a domain of the website to a given public key. Relying parties (users accessing the ecommerce site) can then both create a secure communication session with the site as well as verify that the server engaging in a transaction is associated with the domain named in the certificate. As noted above, however, the time required to generate an OCSP response (i.e., to verify the validity of a certificate) can introduce substantial latency, often 500-1000 msec.

To alleviate this latency, in one embodiment, when the issuance and provisioning component 810 issues a new certificate, the CA 805 provokes the PCDN 825 to generate an OCSP request for the newly issued certificate. Such a request may be sent from the PCDN 825 to the OCSP service 820. Note, this may occur prior to the certificate being delivered to a requesting party or being installed and configured on a server. Once the PCDN 825 receives an OCSP response from the service 820, the response may be stored in the PCDN cache 830 (shown as cached OCSP responses 832). Doing so injects the OCSP response for each certificate into the CDN network concurrent with that certificate being issued. Further, this approach reduces the requirements needed for the CA to provide the OCSP service, as the requests for certificate validity originate from the PCDN, rather than from each client for each transaction (or even from each local node of the CDN).

Once the OCSP response 832 is stored in cache 830 of PCDN 825, the response is then provided to local CDN nodes (e.g., CDN 840$_1$ and 840$_2$) as requests for that OCSP response are received by the PCDN 830. Effectively, the PCDN 825 becomes an origin server for OCSP responses on behalf of the CA 805. When client 855$_{1-2}$ requests an OCSP response from CDN 840$_1$, the CDN 840$_1$ first determines whether the response is stored in cache 845. If so, the response is then served to the requesting client (e.g., client 855$_{1-2}$). If not, the CDN 840$_1$ requests the OCSP response from the PCDN 825. Similarly, when a client 855$_{3-4}$ requests an OCSP response from CDN 840$_2$, the CDN 840$_2$ either returns the response from cache 850 or requests the response from PCDN 825 (and caches the response to service subsequent requests).

Additionally, in one embodiment, the CA 805 may generate an updated OCSP response message once the validity period of the initial OCSP response message expires (or is about to expire). The CA 805 may send the updated OCSP response message to the PCDN or provoke the PCDN to send another request for that OCSP response message.

Figure 9:
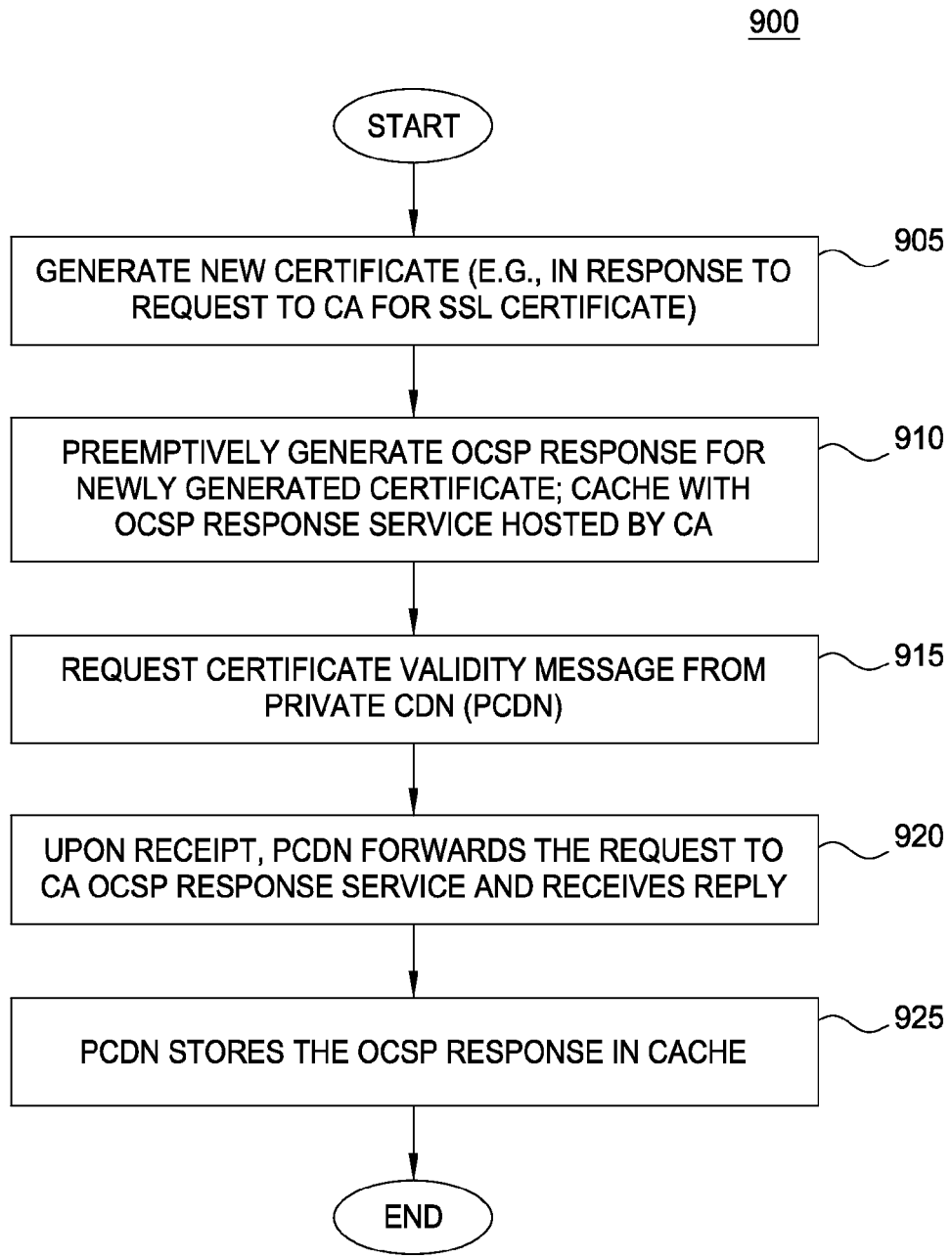
FIG. 9 illustrates a method for provoking a PCDN to cache an OCSP response for a newly issued certificate, according to one embodiment.

FIG. 9 illustrates a method 900 for provoking a PCDN to cache an OCSP response for a newly issued certificate, according to one embodiment. As shown, the method 900 begins at step 905 where a CA issues a new certificate (e.g., an SSL certificate requested by an ecommerce website to bind a public key to the domain of the ecommerce cite). Once issued, at step 910, the CA preemptively generates an OCSP response corresponding to the certificate. As noted, such a response may confirm the validity of the certificate for relatively short period (e.g., 7 days). The CA may locally cache the response at the CA. At step 915, the CA prompts a PCDN associated with a CDN network to send a certificate validity request to an OCSP service hosted by the CA. Once prompted, the PCDN sends a certificate validity request to the OCSP service of the CA (step 920). The request asks the CA to confirm the validity of the certificate issued at step 905. The OCSP service of the CA then provides the OCSP response associated with the certificate to the PCDN, which caches the response (step 925).

Once cached, the OCSP response is available to any local node of the CDN. That is, the PCDN effectively becomes an origin server for the OCSP response relative to the local nodes of the CDN network. Again, this allows the OCSP response to be made available concurrent with the issuance of the certificate, without waiting for the certificate to be installed on a server system or for any client to actually request to determine the current validity of that certificate as part of securing an online transaction. Further, as the response is available from inside the CDN network at the same time the certificate is issued, client response times for obtaining OCSP responses are greatly improved.

Figure 10:
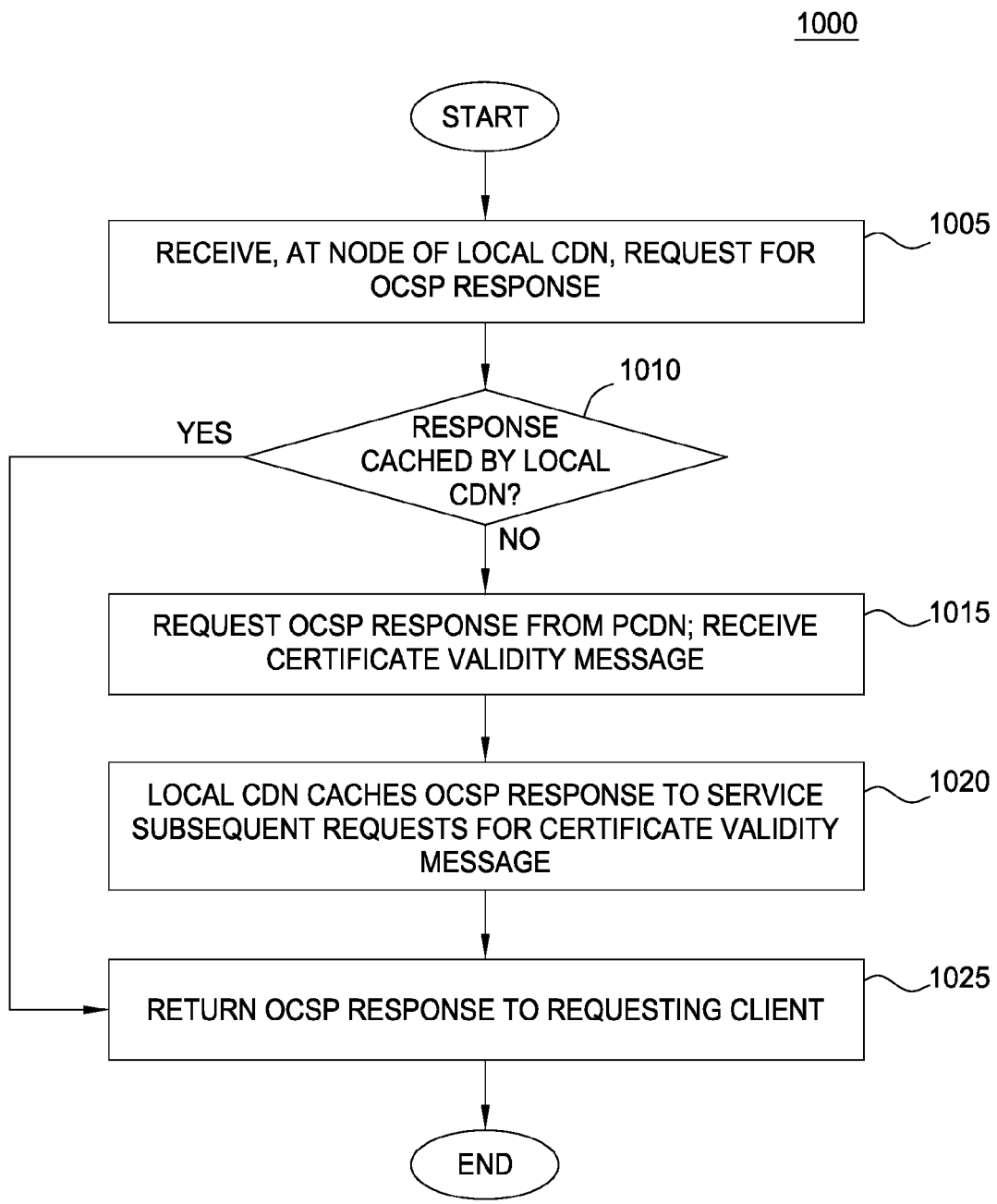
FIG. 10 illustrates a method for a CDN to process requests for an OCSP response received from a relying party, according to one embodiment.

FIG. 10 illustrates a method 1000 for a CDN to process requests for an OCSP response received from a relying party, according to one embodiment. As shown, the method 1000 begins at step 1005 where a local node of a CDN receives a request for an OCSP response relative to a given digital certificate. At step 1010, the local CDN node determines whether the response is available in a local cache of that CDN. If so, at step 1025, the CDN serves the response to the requesting client.

Otherwise, however, if the OCSP response is not available in cache of that CDN, the CDN requests the OCSP response from the PCDN (step 1015). Once the response is received from the PCDN, the local CDN returns the response to the requesting client. Additionally, the CDN and caches the response (step 1025). Doing so allows the local CDN node to subsequently serve the OCSP response to other requesting clients.

As described, embodiments presented herein provide techniques for accelerating the distribution of OCSP responses to a relying party via a CDN. A certificate authority sends a batch of OCSP responses along with pre-generated cache keys for each response to the CDN. Advantageously, the pre-generated cache keys allow the CDN to more quickly process and retrieve the OCSP responses in the cache. Accordingly, embodiments provide process that allows relying parties to more quickly obtain OCSP responses for certificates after sending a request to the certificate authority.

Further, embodiments improve the latency for requests for certificate validity messages for newly issued certificates. Because an OCSP response is generated when a new certificate is issued, and pre-populated to a PCDN, the latency experienced by clients requesting certificate validity messages for new certificates is greatly reduced. Further, the load on CA resources in responding to OCSP requests is greatly reduced, as, effectively; the PCDN becomes an origin server within a CDN network for the OCSP responses.

In the preceding, reference is made to embodiments of the invention. However, the invention is not limited to specific described embodiments. Instead, any combination of the following features and elements, whether related to different embodiments or not, is contemplated to implement and practice the invention. Furthermore, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim (s). Likewise, reference to "the invention" shall not be construed as a generalization of any inventive subject matter disclosed herein and shall not be considered to be an element or limitation of the appended claims except where explicitly recited in a claim(s).

Aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program for use by or in connection with an instruction execution system, apparatus or device.

The flowchart and block diagrams in the Figures illustrate the architecture, functionality and operation of possible implementations of systems, methods and computer program products according to various embodiments of the present invention. In this regard, each block in the flowchart or block diagrams may represent a module, segment or portion of code, which comprises one or more executable instructions for implementing the specified logical function(s). In some alternative implementations the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

Embodiments of the present disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources. A user can access any of the resources that reside in the cloud at any time, and from anywhere across the Internet.

In view of the foregoing, the scope of the present disclosure is determined by the claims that follow.

What is claimed is:

1. A computer-implemented method for reducing response latency for certificate validity messages using a private content delivery network, the method comprising:
   generating, by a certificate authority, a digital certificate;
   upon generating the digital certificate and a certificate validity message for the digital certificate, prompting, by the certificate authority, a computing server in a private content delivery network (PCDN) to request the certificate validity message, wherein the PCDN caches content for distribution to a plurality of local CDN nodes; and
   upon receiving a request for the certificate validity message from the PCDN, sending the certificate validity message to the PCDN.

2. The method of claim 1, wherein the PCDN responds to requests for the certificate validity message from the plurality of local CDN nodes.

3. The method of claim 2, wherein each local CDN node, after receiving the certificate validity message from the PCDN, caches the certificate validity message.

4. The method of claim 1, wherein the certificate validity message is an online certificate status protocol (OCSP) response.

5. The method of claim 1, wherein the digital certificate is an SSL certificate binding a public key listed in the certificate to a server domain named in the certificate.

6. The method of claim 1, wherein the certificate validity message specifies a validity period for relying on the certificate validity message.

7. The method of claim 6, further comprising:
   generating an updated certificate validity message for the digital certificate; and
   sending the updated certificate validity message to the PCDN.

8. A non-transitory computer-readable storage medium storing instructions, which, when executed on a processor, performs an operation for reducing response latency for certificate validity messages using a private content delivery network, the operation comprising:
   generating, by a certificate authority, a digital certificate;
   upon generating the digital certificate and a certificate validity message for the digital certificate, prompting, by the certificate authority, a computing server in a private content delivery network (PCDN) to request the certificate validity message, wherein the PCDN caches content for distribution to a plurality of local CDN nodes; and
   upon receiving a request for the certificate validity message from the PCDN, sending the certificate validity message to the PCDN.

9. The computer-readable storage medium of claim 8, wherein the PCDN responds to requests for the certificate validity message from the plurality of local CDN nodes.

10. The computer-readable storage medium of claim 9, wherein each local CDN node, after receiving the certificate validity message from the PCDN, caches the certificate validity message.

11. The computer-readable storage medium of claim 8, wherein the certificate validity message is an online certificate status protocol (OCSP) response.

12. The computer-readable storage medium of claim 8, wherein the digital certificate is an SSL certificate binding a public key listed in the certificate to a server domain named in the certificate.

13. The computer-readable storage medium of claim 8, wherein the certificate validity message specifies a validity period for relying on the certificate validity message.

14. The computer-readable storage medium of claim 13, wherein the operation further comprises:
   generating an updated certificate validity message for the digital certificate; and
   sending the updated certificate validity message to the PCDN.

15. A system, comprising:
a processor; and
a memory hosting an application, which, when executed on the processor, performs an operation for reducing response latency for certificate validity messages using a private content delivery network, the operation comprising:
generating, by a certificate authority, a digital certificate,
upon generating the digital certificate and a certificate validity message for the digital certificate, prompting, by the certificate authority, a computing server in a private content delivery network (PCDN) to request the certificate validity message, wherein the PCDN caches content for distribution to a plurality of local CDN nodes, and
upon receiving a request for the certificate validity message from the PCDN, sending the certificate validity message to the PCDN.

16. The system of claim 15, wherein the PCDN responds to requests for the certificate validity message from the plurality of local CDN nodes, and wherein each local CDN node, after requesting the certificate validity message from the PCDN, caches the certificate validity message.

17. The system of claim 15, wherein the certificate validity message is an online certificate status protocol (OCSP) response.

18. The system of claim 15, wherein the digital certificate is an SSL certificate binding a public key listed in the certificate to a server domain named in the certificate.

19. The system of claim 15, wherein the certificate validity message specifies a validity period for relying on the certificate validity message.

20. The system of claim 19, wherein the operation further comprises:
generating an updated certificate validity message for the digital certificate; and
sending the updated certificate validity message to the PCDN.

* * * * *